US010845487B2

(12) United States Patent
Liu et al.

(10) Patent No.: US 10,845,487 B2
(45) Date of Patent: Nov. 24, 2020

(54) ACQUISITION IN GLOBAL NAVIGATION SATELLITE SYSTEMS BASED ON PREVIOUSLY ACQUIRED SATELLITES (71) Applicant: Microsoft Technology Licensing, LLC, Redmond, WA (US)

(72) Inventors: Jie Liu, Medina, WA (US); Nissanka B. Priyantha, Redmond, WA (US); Lucas N. Joppa, Sammamish, WA (US); Qiang Xu, Hamilton (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 15/621,816

(22) Filed: Jun. 13, 2017

(65) Prior Publication Data

US 2018/0356530 A1 Dec. 13, 2018

(51) Int. Cl.
*G01S 19/28* (2010.01)
*G01S 19/09* (2010.01)
*G01S 19/34* (2010.01)
*G01S 19/24* (2010.01)
*G01S 19/01* (2010.01)

(52) U.S. Cl.
CPC ............. *G01S 19/28* (2013.01); *G01S 19/09* (2013.01); *G01S 19/34* (2013.01); *G01S 19/01* (2013.01); *G01S 19/24* (2013.01)

(58) Field of Classification Search
CPC .......... G01S 19/28; G01S 19/09; G01S 19/34; G01S 19/01; G01S 19/24; G01S 19/26
USPC ............................................. 342/357.42, 420
See application file for complete search history.

(56) References Cited

U.S. PATENT DOCUMENTS

| 5,402,347 A | 3/1995 | McBurney et al. |
| 6,392,593 B1 | 5/2002 | Pemble |
| 6,720,915 B2 | 4/2004 | Sheynblat |

(Continued)

FOREIGN PATENT DOCUMENTS

| EP | 0353849 A1 * | 2/1990 | ........... G01S 19/426 |
| EP | 0353849 A1 | 2/1990 | |

(Continued)

OTHER PUBLICATIONS

Marco Scutari, Learning Bayesian Networks with the bnlearn R Package, Journal of Statistical Software, Jul. 10, 2010 (Year: 2010).*

(Continued)

*Primary Examiner* — Erin F Heard
*Assistant Examiner* — Michael W Justice
(74) *Attorney, Agent, or Firm* — Schwegman Lundberg & Woessner, P.A.

(57) ABSTRACT

A location system acquires a first set of Global Navigation Satellite System (GNSS) satellites from a first set of raw GNSS signal data received by a GNSS receiver, using all of the coarse acquisition (C/A) codes for the system of GNSS satellites, to determine a first set of GNSS satellites to use for location processing. At a later time, the location system determines respective sets of GNSS satellites as subsets of successive sets of previously determined sets of GNSS satellites. When the number of identified satellites is less than a threshold, the location system again acquires a set of GNSS satellites from raw data using all of the C/A codes for the system of GNSS satellites.

20 Claims, 7 Drawing Sheets

(56) References Cited

U.S. PATENT DOCUMENTS

| | | |
|---|---|---|
| 7,154,438 B2 | 12/2006 | Pitt et al. |
| 7,250,904 B2 | 7/2007 | King et al. |
| 7,538,726 B1 * | 5/2009 | Tester ................... G01S 19/05 |
| | | 342/357.29 |
| 7,612,714 B2 * | 11/2009 | Chen ..................... G01S 19/28 |
| | | 342/357.66 |
| 8,111,736 B2 | 2/2012 | Krasner |
| 9,250,330 B2 | 2/2016 | Rhodes et al. |
| 2003/0231132 A1 * | 12/2003 | Park ..................... G01S 19/28 |
| | | 342/357.25 |
| 2012/0146850 A1 | 6/2012 | Liu et al. |
| 2012/0306689 A1 * | 12/2012 | Yule ..................... G01S 5/0036 |
| | | 342/357.25 |
| 2013/0162468 A1 | 6/2013 | Kim et al. |
| 2015/0061934 A1 | 3/2015 | Liu et al. |
| 2015/0116151 A1 | 4/2015 | Liu et al. |
| 2016/0259032 A1 * | 9/2016 | Hehn ................... G01S 5/0289 |
| 2016/0259061 A1 * | 9/2016 | Carter .................. G01S 19/14 |

FOREIGN PATENT DOCUMENTS

| | | | |
|---|---|---|---|
| WO | 0036431 A1 | 6/2000 | |
| WO | WO-0036431 A1 * | 6/2000 | ............. G01S 19/06 |

OTHER PUBLICATIONS

Katru, et al., "Evaluate the Performance of Cloud-Offloaded-GPS and Its Parameters Using Real GPS Traces", In International Journal & Magazine of Engineering, Technology, Management and Research, vol. 2, Issue 11, Nov. 2015, pp. 1629-1636.

Liu, et al., "Energy Efficient GPS Sensing with Cloud Offloading", In Proceedings of the 10th ACM Conference on Embedded Network Sensor Systems, Nov. 1, 2012, 14 pages.

Misra, et al., "Energy Efficient GPS Acquisition with Sparse-GPS", In, Apr. 17, 2014, 12 pages.

"International Search Report and Written Opinion Issued in PCT Application No. PCT/US2018/034027", dated Dec. 10, 2018, 13 Pages.

* cited by examiner

ACQUISITION IN GLOBAL NAVIGATION SATELLITE SYSTEMS BASED ON PREVIOUSLY ACQUIRED SATELLITES

BACKGROUND

Global Navigation Satellite Systems (GNSS) allow devices to calculate their geospatial position based upon signals sent from GNSS satellites. Example GNSS' include the Global Positioning System (GPS), Global Navigation Satellite System (GLONASS), and Galileo. GNSS satellites carry very stable atomic clocks and continuously broadcast their current time and position which can be utilized by ground-based computing devices with receivers to calculate the computing device's position. For example, the computing devices receive radio transmissions from multiple satellites and calculate their position using constraint optimization techniques such Least Squares minimization. Typically, a receiver needs at least 4 visible satellites to determine its location.

SUMMARY

Some embodiments relate to computing a geolocation of devices based upon GNSS signals. Embodiments further relate to processing enhancements and acquisition enhancements. For example, acquiring a first set of Global Navigation Satellite System (GNSS) satellites from a first set of raw GNSS signal data received by a GNSS receiver to produce first acquisition data, the first set of raw GNSS signal data received at a first time T, determining a second set of GNSS satellites based upon the first set of GNSS satellites, acquiring a third set of GNSS satellites based upon a received second set of raw GNSS signal data corresponding to a second time T2 to produce second acquisition data, the operation of acquiring the third set of GNSS satellites only attempting to acquire satellites from the second set of GNSS satellites, and utilizing the first acquisition data to calculate a position of the computing device at time T and utilizing the second acquisition data to calculate a position of the computing device at time T2.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Computing devices utilizing GNSS signals to determine a geolocation perform operations that include collection of GNSS signals, acquisition of GNSS satellites, and localization. Acquisition of GNSS signals comprises operations to find which GNSS satellites (32 in the case of GPS) are visible to the device being located. Localization involves operations that use the information in the GNSS signals from the set of acquired satellites to calculate a position. These operations are processor intensive and therefore require a lot of energy to perform. For devices that wish to minimize power consumption, this can be problematic.

Approaches such as Cloud-Offloaded GPS (CO-GPS) collect raw GNSS signals and send them to a cloud service (termed: a network-based GNSS service) which performs the acquisition and localization steps. This approach achieves substantial energy consumption savings over a standalone GNSS receiver as acquisition and localization are responsible for the majority of energy-consumption in the process.

Despite these gains, CO-GPS is not without problems. One problem is the excessive amount of data to be transferred from the computing devices to the cloud server. For computing devices with irregular network connections, the amount of data that is stored and then transferred when a network connection is found can be enormous. For example, one GNSS location fix in CO-GPS requires turning on the GNSS receiver for 10 ms. As a result, 40 KB of signal data will be collected for a single location fix (using a 16.368 MHz sampling frequency). If location samples are taken every minute, this accumulates to 60 MB in a day and 420 MB in a week. This excessive data brings with it long transmission times and large energy consumption. It also increases device cost by increasing the amount of memory necessary to store the data prior to transmission.

As an example, consider a wildlife tracker where the wildlife may not be proximate to a wireless network for long periods of time. When the wildlife tracker finally establishes a connection with a wireless network, the device may have gigabytes of data to transmit. In general, even devices that are connected regularly to a network, such as a smartphone or other Internet of Things (IOT) device may incur excessive battery usage as a result of the increased data transfers. For example, to transfer 60 MB of GPS signal data, the following table lists the energy consumption and required time for various wireless technologies:

|  | Uplink Throughput | Required Time | Energy |
| --- | --- | --- | --- |
| WiFi (IEEE 802.11b) | .94 Mbps | 511 s | 204 J |
| 3G | 400 Kbps | 1200 s | 1398 J |
| LTE | 6 Mbps | 80 s | 313 J |
| Satellite (Argos) | 2.5 Kbps | 187,500 s | N/A |

Disclosed in some examples are methods, systems, devices, and machine readable mediums which utilize a new GNSS processing method called cloud-offloaded, device-acquisition GPS (CODA-GPS). CODA-GPS balances the energy efficiency of offloading computations to the cloud with the transmission time and energy consumption that such offloading entails. In some examples, rather than offloading both acquisition and localization, the computing device performs the acquisition and sends the resultant acquisition data to the cloud for localization. Further enhancements can be obtained by batching the acquisition processing, which saves costs associated with repeatedly waking the hardware processor that performs the acquisition from a low powered state. Thus, instead of processing the received GNSS signals in real-time, they are processed in batches. The acquisition of signals in a same batch may be performed continuously.

While the method is termed a CODA-GPS, one of ordinary skill in the art with the benefit of the present disclosure will appreciate that the method will work with other GNSS services as well.

The purpose of satellite acquisition is to determine visible GNSS satellites and coarse values of the carrier frequency and code phase of those satellites. For GPS satellites, the satellites are differentiated by 32 different and highly orthogonal Pseudorandom Noise (PRN) sequences called coarse acquisition (C/A) codes. When a GNSS receiver first starts up, it detects what satellites are in view. This is done by detecting the presence of the corresponding C/A codes in the received signal, typically by correlating the signal with each known C/A code template. Since the C/A codes are designed to be orthogonal to each other, a visible satellite will show a spike in the correlation results, and an invisible satellite will not cause any detectable spike.

A further challenge added to acquiring satellites is accounting for Doppler frequency shifts caused by the motion of the satellite and the receiver on the ground. For example, a rising GNSS satellite can move at up to 800 m/s toward the receiver, causing a frequency shift of the GPS L1 frequency of 1575.42 MHz*800/c=4.2 kHz (where c is the speed of light). A shift in the opposite direction happens for a setting satellite. To reliably compute a correction under this shift, the receiver generates the C/A code within 500 Hz of the shifted frequency. Therefore in the frequency dimension, the receiver searches the space +/−4.2 kHz (8.4 total Khz) in 500 Hz chunks, or buckets. Thus, receivers will search 18 buckets (including the exact frequency bucket) at minimum. In practice, they may search 25-40 frequency bins to account for local receiver motion and to provide for better sensitivity.

After compensating for the Doppler frequency shifts, the receiver also compensates for code phase delays. This is because the receiver does not have a clock synchronized with the satellite, and because the signal propagation delay may be affected by atmospheric conditions. As a result, the receiver usually over samples the 1023 bps C/A code. Assuming that the receiver samples the baseband signal at 8 Mhz, in a brute force method, the receiver may search 8184 code phase positions to find the best correlation peak. As can be appreciated, acquisition may be an expensive operation as a computing device may search through 30+ frequency bins times 8,000+ code phase possibilities for every satellite.

Also disclosed in some examples, are methods, systems, and machine-readable mediums which provide for reduced acquisition calculations by limiting the set of satellites that the computing device searches to a subset S of all the possible satellites. The set S is a subset containing one or more possible satellites that the computing device predicts are visible. The set S is determined based upon the last set of visible satellites. This may reduce the search time considerably and is based upon the observation that the visible satellites seen over a period of time are relatively static.

In one approach, the system may initially search over all satellites to find the satellites that are in view. The next time the system tries to acquire the satellites, it uses the set of satellites determined to be in view the previous acquisition. The set of satellites determined to be in view is then adjusted to remove any satellites that have disappeared from view. This continues until the number of satellites in the set is less than a predetermined threshold—at which time the system performs a reacquisition on all satellites again. In another implementation, the system may attempt to predict the set of satellites by using association rule learning based upon past observed data to determine the likely set of visible satellites for time t+1 based upon observed satellites at time t.

Figure 1:
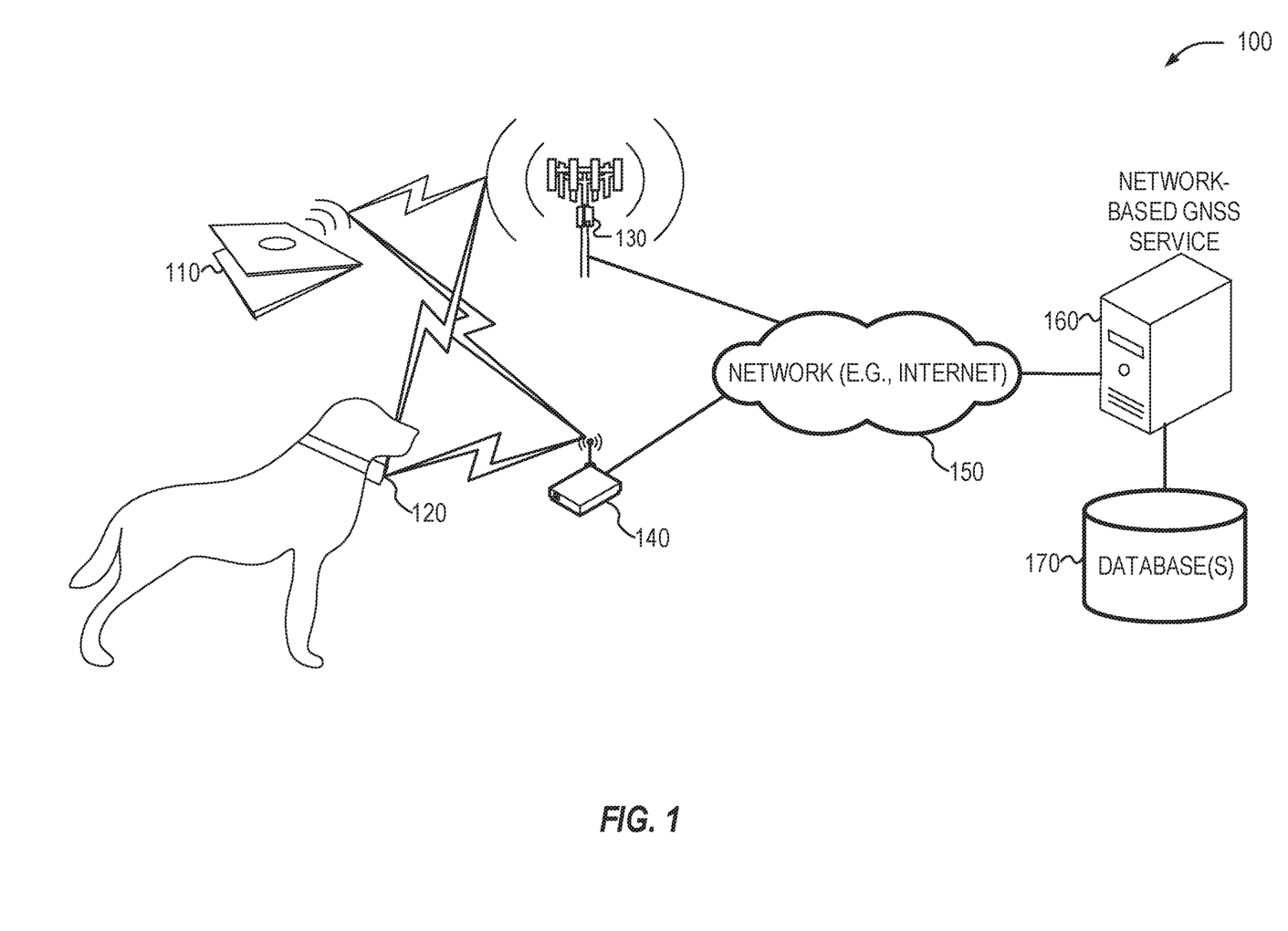
FIG. 1 shows a diagram of a Cloud-Offloaded Global Positioning System (CO-GPS) and a Cloud-Offloaded Device Acquisition Global Positioning System (CODA)-GPS environment according to some examples of the present disclosure.

FIG. 1 shows a diagram 100 of an environment suitable for a CO-GPS and/or CODA-GPS according to some examples of the present disclosure. Computing devices with GNSS receivers, such as laptop computing device 110, wildlife tracker 120, and the like may connect at various times to a wireless network provided by cellular network equipment, such as a cellular base station 130, a Wi-Fi router 140, or the like. Cellular base station 130 and the Wi-Fi router 140 allow the computing devices to communicate over a network, such as network 150 with one or more other computing devices. For example, they may allow the laptop computing device 110 or the wildlife tracker 120 to communicate with a network-based GNSS service 160. For example, the laptop computing device 110, wildlife tracker 120, or other devices may transmit raw GNSS signals or partially processed GNSS information (such as an output of the acquisition data) for processing and storage in database 170. In other examples, laptop computing device 110 and wildlife tracker 120 may perform both acquisition and localization on the device to produce a geolocation. The geolocation may be utilized on the device, or may be sent to the network-based GNSS service for network-based location based applications.

Figure 2:
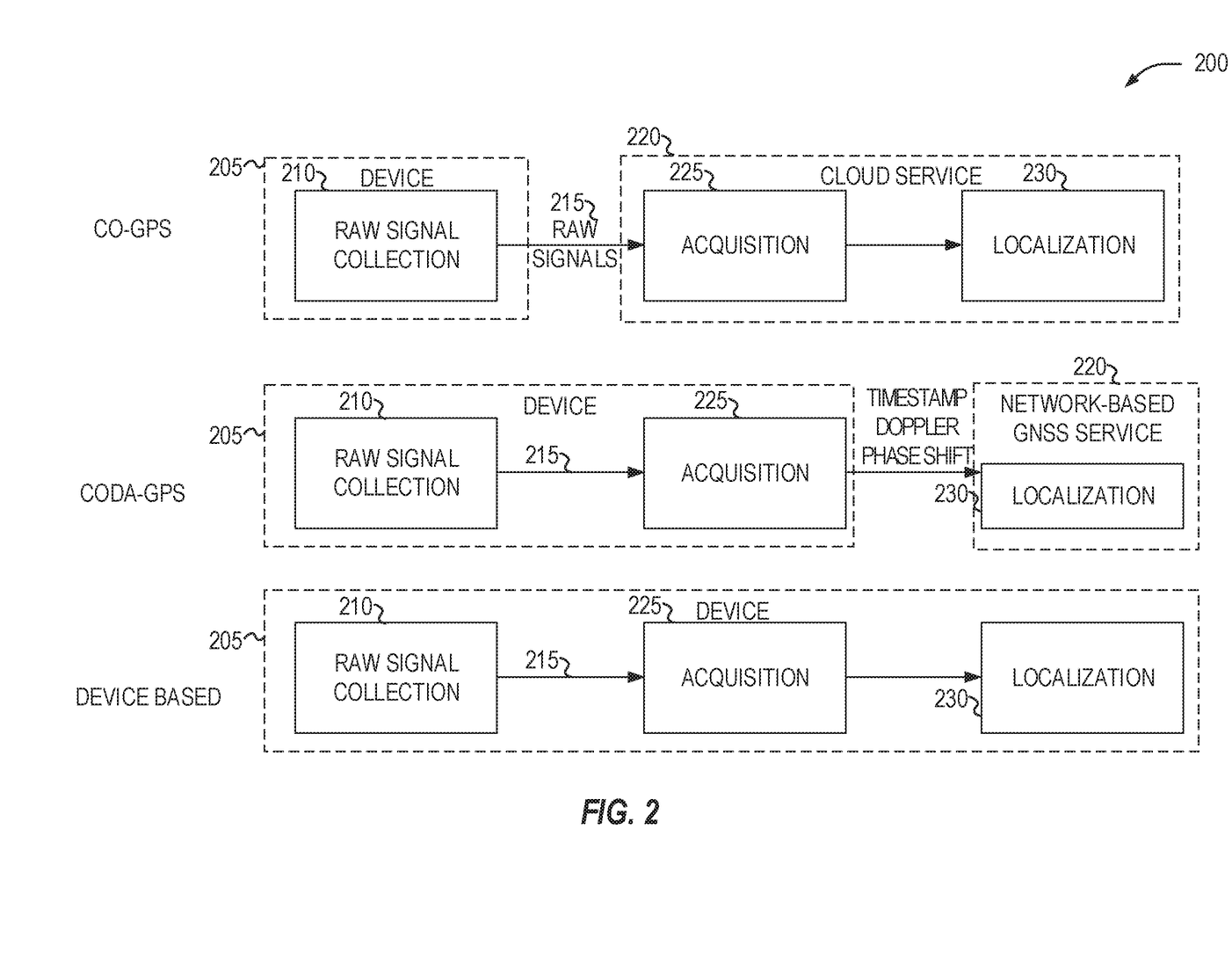
FIG. 2 shows a comparison diagram between CO-GPS and CODA-GPS according to some examples of the present disclosure.

FIG. 2 shows a comparison diagram 200 between CO-GPS, CODA-GPS, and device-based GPS according to some examples of the present disclosure. In CO-GPS, the device 205 acquires raw GNSS signals 215 at block 210 and transfers them to the network-based GNSS service 220 where they are used for acquisition 225 and localization 230. For CODA-GPS, the device 205 collects the raw GNSS signals 215 at block 210 and does the acquisition 225 at the device (rather than the network-based GNSS service 220). The device 205 then sends the results of the acquisition such as timestamps and Doppler phase shift information to the network-based GNSS service 220 to perform localization 230. For device-based GPS, all operations are performed on the device using the device's computing resources and power.

Figure 3:
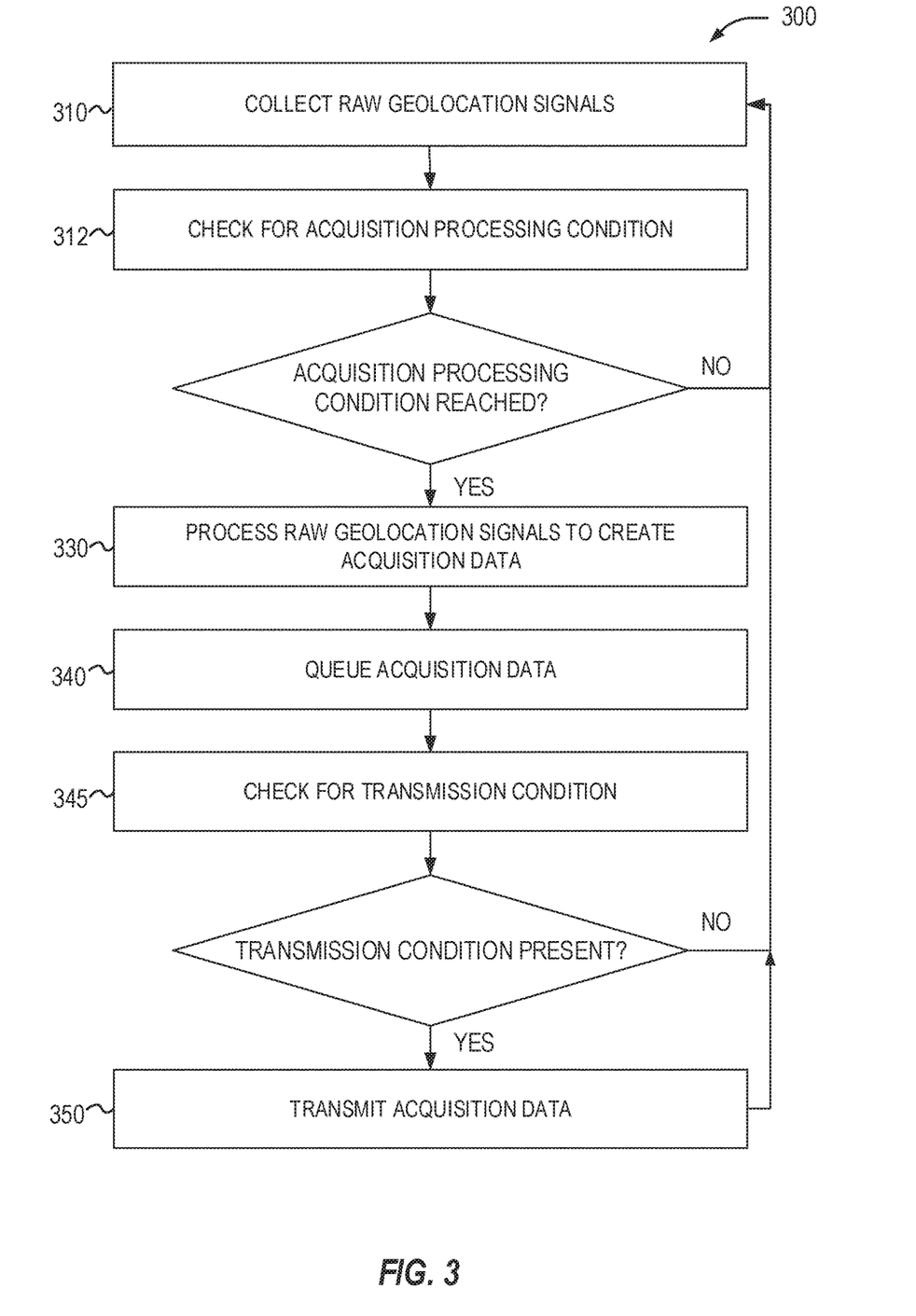
FIG. 3 shows a flowchart of a method for CODA-GPS performed by a computing device according to some examples of the present disclosure.

FIG. 3 shows a flowchart of a method 300 for cloud-offloaded, device-acquisition GPS performed by a computing device according to some examples of the present disclosure. At operation 310 the computing device receives and collects the raw GPS (or other GNSS) geolocation signals. At operation 312 the system may check to see if an acquisition processing condition has been reached. For example, if a certain amount of time has passed since the last acquisition, a certain amount of raw signal data has been collected, a memory device is nearing capacity, the system is within range of a wireless network for transferring data, the system's hardware processor has woken up for a reason not related to GPS processing, a new set of GNSS geolocation signals have arrived, or the like. If an acquisition processing condition has not been reached, then the computing device may continue to collect raw geolocation signals at operation 310.

At operation 330, if an acquisition processing condition is reached, the raw geolocation signals may be processed to create an acquisition data set. The acquisition data set may be timestamped for correlation of the acquired satellites and geolocation data with a position later calculated using the acquisition data set. At operation 340 this acquisition data set may be stored. At operation 345, a transmission condition may be checked. For example, a certain amount of time has passed since the last transmission, a certain amount of acquisition data has been collected, a memory device is nearing capacity, the system is within range of a wireless network for transferring data, the system's hardware processor has woken up for a reason not related to GPS processing, or the like.

If the transmission condition is not present, the system may continue collecting and processing GPS data. On the other hand, if the transmission condition is present, the computing device may transmit the acquisition data sets in storage to a network-based GNSS service at operation 350. Each set of acquisition data may be utilized by the network-based GNSS service to calculate the position of the computing device at the time indicated by the corresponding timestamp and may comprise each acquired satellite's code phases and Doppler shifts, as well as the timestamp.

As previously noted, there are additional optimizations that may be made to the GPS acquisition process. These optimizations may be utilized with the CO-GPS, CODA-GPS, or regular GNSS processing (where all processing is done on the computing device) to improve acquisition time. For example, the number of satellites that are searched during acquisition may be reduced by predicting the likely set of visible satellites and only performing the acquisition algorithms on that set of satellites.

Traditional satellite prediction determines the visibility of satellites with respect to a stationary ground station given a satellite's orbit. In the present disclosure, the method determines the visibility of satellites with respect to a mobile ground object (e.g., a computing device such as a sensor node) given the previously visible satellites. The difference comes from the fact that the computing device has no access to the orbit information (e.g., the almanac) in the GNSS sensing scheme.

The present disclosure utilizes the visible satellites at time t to estimate the visible satellites at time t+1. In order to determine the visibility of a satellite from a site, the slant-range vector from the site to the satellite is found. This may be obtained by looking at the third component of the range vector in the topocentric-horizon coordinate system (e.g., the SEZ coordinate system). If the satellite is above the horizon, the third component in the vector is positive. Using this method, a set of visible satellites can be determined giving a specific time and the coordinates of the site.

Figure 4:
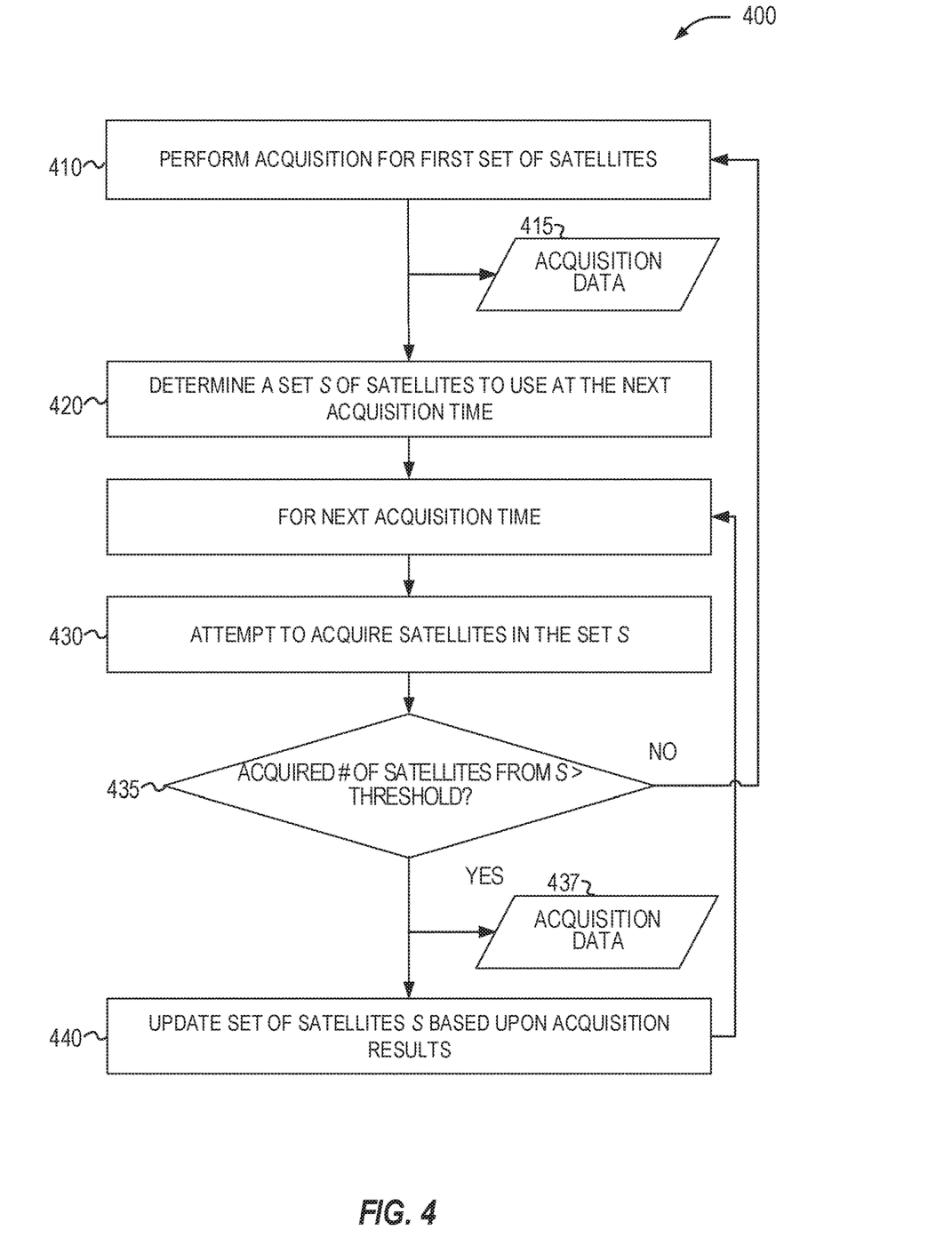
FIG. 4 shows a flowchart of an acquisition method that incorporates satellite prediction according to some examples of the present disclosure.

FIG. 4 shows a flowchart of an acquisition method 400 that incorporates satellite prediction according to some examples of the present disclosure. The operations of FIG. 4 may be performed with CO-GPS, CODA-GPS, or regular device-based GNSS processing techniques. For example, with respect to CODA-GPS, the operations of FIG. 4 may occur as part of operation 330 of FIG. 3. For example, operations 410 and 420 may be performed at operation 330 a first time operation 330 is performed. Operations 430-440 may be performed the next time operation 330 is performed.

At operation 410, the device may perform the acquisition looking for a first set of GNSS satellites utilizing raw GNSS signal data received from a GNSS receiver. In some examples, the first set may be all the GNSS satellites. The results of this acquisition are output as acquisition data 415 and correspond to the timeframe in which the raw GNSS signals used at operation 410 were captured. At operation 420 the device may utilize the acquisition results to determine a set of satellites S that will be utilized the next time the device performs an acquisition. In some examples, S will be the set of satellites that were determined to be visible at operation 410. In other examples S may be predicted using machine learning, association rule learning, or other heuristics.

At the next acquisition time at operation 430, the device attempts to acquire from a new set of raw GNSS signal data received from the GNSS receiver the satellites in the set S only. That is, the device does not attempt to acquire the satellites that are not in the set S. The next acquisition time may be a second time that operation 330 is performed—either based upon a second set of raw GNSS signal data in the case of batch mode operation, or when a new batch of GNSS signal data is sampled.

As a result of operation 430, acquisition data 437 may be output that corresponds to the time when the new set of raw GNSS signal data was received. In some examples, prior to outputting the acquisition data 437, the number of satellites of S actually acquired may be compared with a predetermined threshold number at operation 435. If the number of acquired satellites is less than or equal to the threshold then the system may perform a full acquisition on all the satellites (or in some examples, all the satellites not in set S). The satellites that are acquired at this operation are used as output acquisition data 415.

If the acquired number of satellites from S is greater than the threshold, or the threshold is not checked, then the system may output acquisition data 437. At operation 440, the set of satellites S may be updated based upon the satellites actually acquired. For example, the set of satellites S may be updated to remove satellites that were not successfully acquired at operation 430. Operation proceeds to a next acquisition time—e.g., a second time that operation 330 is performed—either based upon a third set of raw GNSS signal data in the case of batch mode operation, or when a new batch of GNSS signal data is sampled at a still later time. Operation in this manner may continue indefinitely in the case of non-batch mode operation, or until all the batched raw GNSS signal data is processed.

Acquisition data 415 and acquisition data 437 may be utilized to calculate a geolocation of the computing device. This calculation may be done on the computing device (e.g., using a least squares minimization), or may be done on a network-based GNSS service as a result of a transmission of this data by the computing device to the network-based GNSS service.

Figure 5:
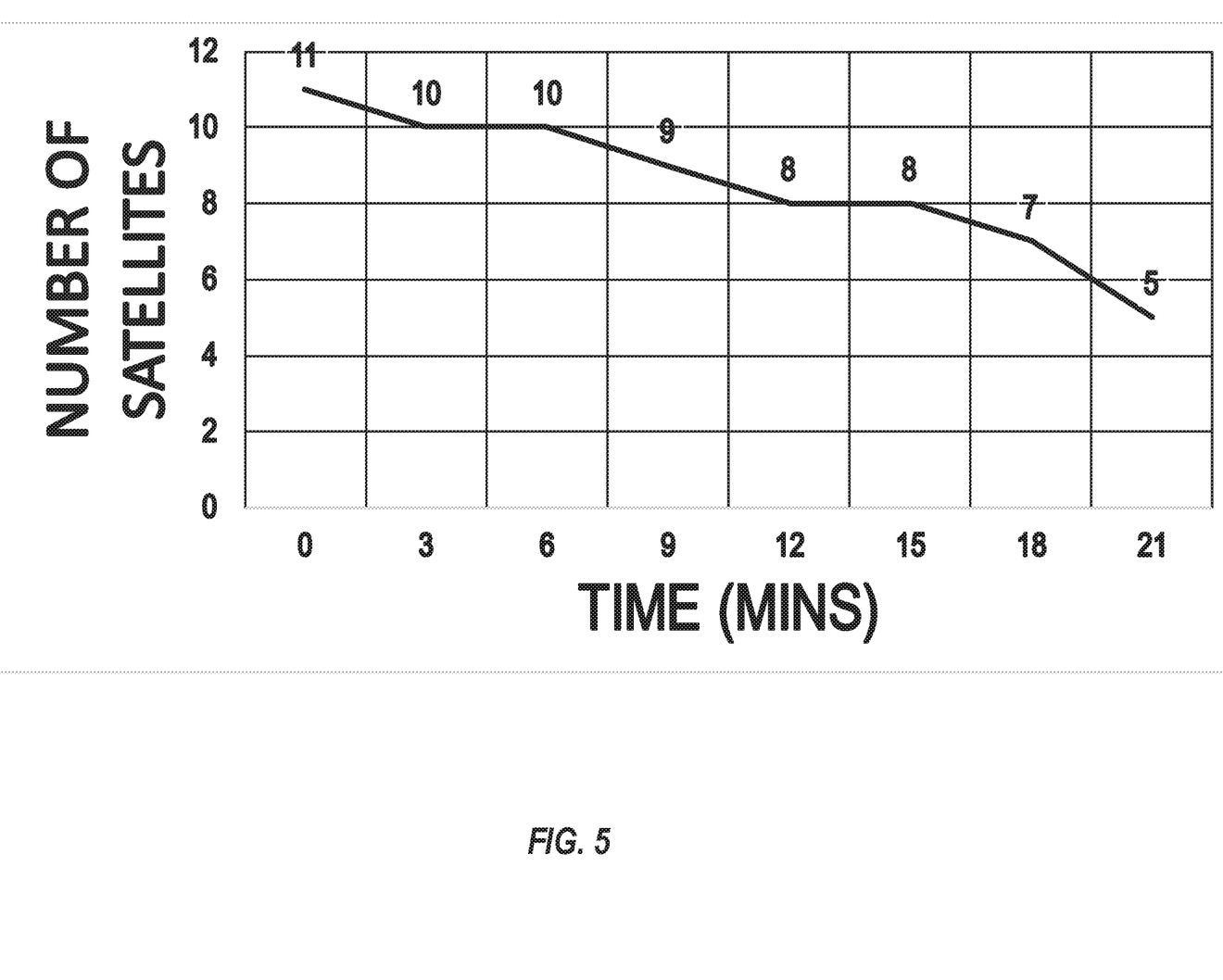
FIG. 5 shows a graph showing experimental results that show a decay from a set of eleven original visible satellites to five visible satellites over twenty-one minutes.

As previously described, one approach is to utilize the satellites in time t+1 that were acquired in time t. This is effective as the visible satellites are fairly constant. FIG. 5 shows a graph showing experimental results that show a decay from a set of eleven original visible satellites to five visible satellites over twenty-one minutes. As the device only needs four satellites to calculate its geolocation, there is no need to perform a reacquisition of all thirty-two satellites within this twenty-one minute period (and perhaps longer). For example, at six minutes, only ten satellites are tested for line of site—that's a processing and power savings of twenty-two satellites—saving more than 50% of the calculations necessary. In the graph, if the threshold is six satellites, then at time twenty-one, the system may attempt to reacquire all satellites and reset the set of satellites for the next acquisition to the subset of all the satellites that were acquired at twenty-one minutes.

Another approach is to make predictions about what satellites are going to be visible in time t+1 based upon the set of satellites visible in time t using association rule learning. Association rule learning identifies rules based upon finding patterns that appear in a data set frequently. For example, if past GPS data indicated that if satellites 1, 5, and 7 were observed at time t, that satellites 1, 5, 7, and 8 were usually observed at time t+1, then S may comprise satellites 1, 5, 7, and 8. In visible satellite prediction, the problem is formulated as a size-2 adjacent frequent pattern mining given a set of sequences of visible satellites.

Let $S_{loc_i,t_i}$ be the set of observed satellites at time $t_i$ and location $loc_i$, the prediction for the set of satellites S at time $t_{i+1}$ and location $loc_{i+1}$ can be estimated using the confidence score as defined by the association rule learning. The confidence is an indication of how often the rule has been found to be true in a larger historical data set of satellite visibility $$conf(S_{loc_i,t_i} \Rightarrow X) = \frac{count(S_{loc_i,t_i}, X)}{count(S_{loc_i,t_i})}$$

That is the confidence is a count of the number of times both $S_{loc_i,t_i}$ and another satellite (or set of satellites) X were visible divided by the number of times only $S_{loc_i,t_i}$ was visible. Given the confidence score, we can find an ideal $X^*_{i+1}$ by maximizing the confidence score:

$$X^*_{i+1} = \arg \max_x conf(S_{loc_i,t_i} \Rightarrow X)$$

To find S, we take the union of $X^*_{i+1}$ and $S_{loc_i,t_i}$, thus $$S = X^*_{i+1} \cup S_{loc_i,t_i}$$

Under either approach, the system utilizes the set of acquired satellites at a first time to predict the set of visible satellites at a second time. These approaches do not require or rely upon decoding the GNSS signals to determine the almanac or any other information in the GNSS signals themselves other than detecting the correlation peak in order to acquire the satellites. The disclosed approaches are contrasted with another approach—A-GPS that uses infrastructure components that assist in acquiring the GPS signal by providing ephemeris data, almanac data, initial values for Doppler and code phase searches and the like. Under A-GPS the computing device utilizes a network connection whereas the current approach does not require a network connection.

Figure 6:
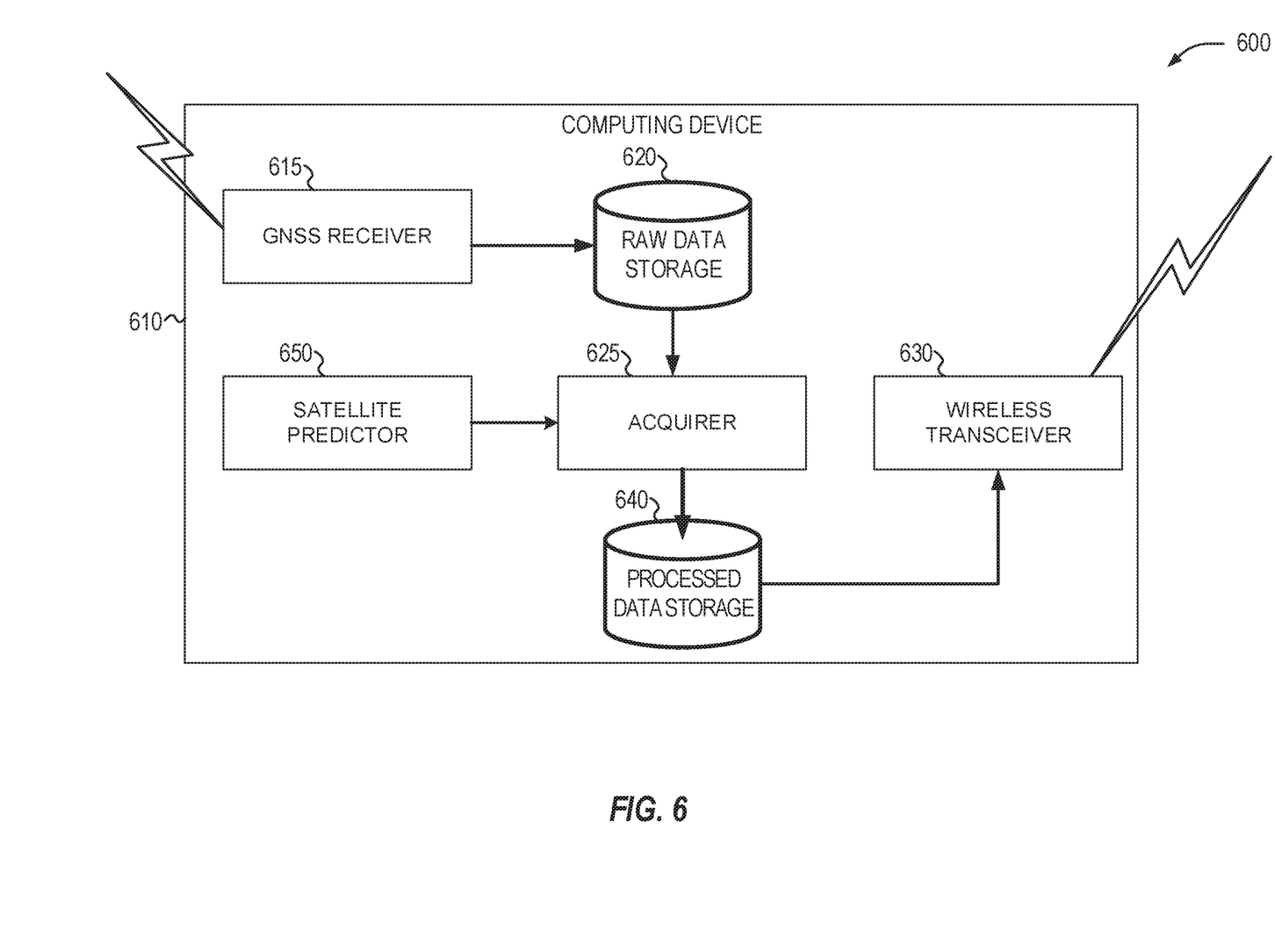
FIG. 6 shows a logical diagram of a data flow between components of a computing device according to some examples of the present disclosure.

FIG. 6 shows a logical diagram 600 of a data flow between components of a computing device according to some examples of the present disclosure. The components of FIG. 6 may be hardware implemented or may be implemented by software executing on one or more general purpose hardware processors. The organization of the components of FIG. 6 is exemplary and one of ordinary skill in the art with the benefit of the present disclosure will appreciate that the components of FIG. 6 may be combined, split, or otherwise rearranged.

GNSS receiver 615 receives GNSS satellite signals and stores them in raw data storage 6220. Periodically, the acquirer 625 processes the raw signals to acquire the satellites from the raw signals. The acquirer 625 may attempt to acquire all satellites, or may search for a subset of the set of all possible satellites S based upon a set S of satellites determined by the satellite predictor 650. Satellite predictor 650 may utilize the set of satellites found at time t to predict the set S of satellites at time t+1. This may be done using the set of satellites at time t that were successfully acquired or may be done using association rule learning as previously described. For example, pairs of satellites may be found that have confidence scores above a predetermined threshold.

Once the acquirer has acquired the satellites, the acquisition data may be stored in the processed data storage 640. Raw data storage 620 and processed data storage 640 may be the same storage device or different storage devices. Wireless transceiver 630 may transmit the processed data in processed data storage 640 to a network-based GNSS service when a network connection is present. The network-based GNSS service may utilize the acquisition data to perform localization on the computing device. For example, multiple sets of acquisition data may be timestamped by the device and sent to the network-based GNSS service. The network-based GNSS service may then utilize this timestamped data to produce a log of the device's locations at various times.

Figure 7:
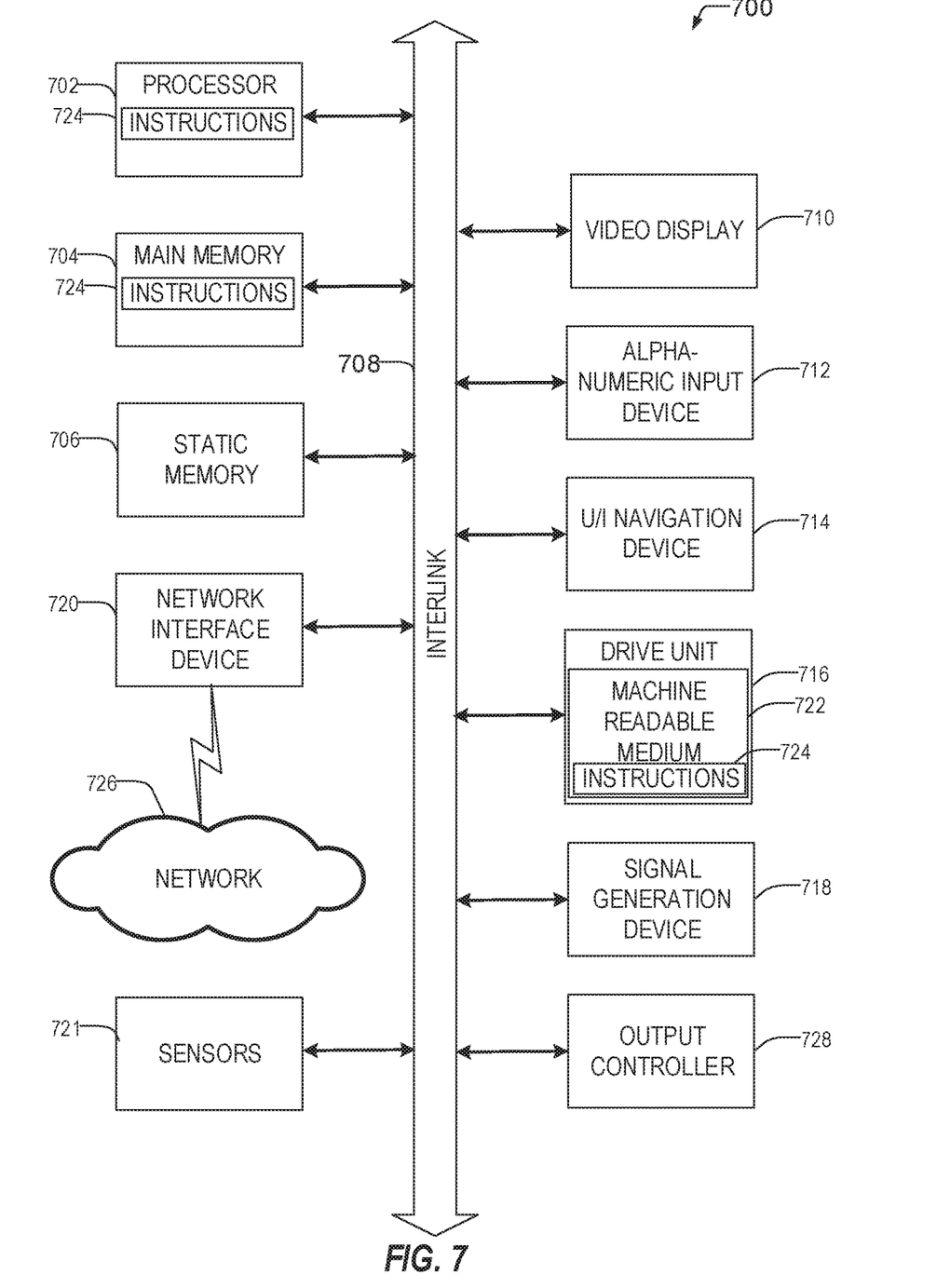
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may be performed. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a computing device such as a personal computer (PC), a tablet PC, a laptop PC, an animal tracker, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, one or more machines 700 may be configured to implement the network-based GNSS service, the computing device 610, perform CO-GPS, CODA-GPS, and the methods of FIGS. 3-4. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720. The Machine 700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

OTHER NOTES AND EXAMPLES

Example 1 is a computing device comprising: a Global Navigation Satellite System (GNSS) receiver; a hardware processor communicatively coupled to the GNSS receiver; and a memory, communicatively coupled to the hardware processor and comprising instructions, which when executed by the hardware processor cause the computing device to execute operations comprising: acquiring a first set of GNSS satellites from a first set of raw GNSS signal data received by the GNSS receiver to produce first acquisition data, the first set of raw GNSS signal data received at a first time T; determining a second set of GNSS satellites based upon the first set of GNSS satellites; acquiring a third set of GNSS satellites based upon a received second set of raw GNSS signal data corresponding to a second time T2 to produce second acquisition data, the operation of acquiring the third set of GNSS satellites only attempting to acquire satellites from the second set of GNSS satellites; and utilizing the first acquisition data to calculate a position of the computing device at time T and utilizing the second acquisition data to calculate a position of the computing device at time T2.

In Example 2, the subject matter of Example 1 optionally includes operations of: sending the first and second acquisition data to a network-based GNSS service, the network-based GNSS service utilizing the first and second acquisition data to calculate the position of the computing device at time T and T2.

In Example 3, the subject matter of any one or more of Examples 1-2 optionally include operations of: performing a least squares minimization at the computing device.

In Example 4, the subject matter of any one or more of Examples 1-3 optionally include wherein the operations of determining the second set of GNSS satellites based upon the first set of GNSS satellites comprises operations of: setting the second set of GNSS satellites to be the first set of GNSS satellites; and wherein the operations further comprise: determining that a number of satellites acquired in the third set of GNSS satellites is less than a predetermined threshold, and in response, reacquiring the third set of GNSS satellites based upon the received second set of raw GNSS signal data to produce the second acquisition data, the acquiring operation attempting to acquire satellites from the first set of GNSS satellites.

In Example 5, the subject matter of any one or more of Examples 1-4 optionally include wherein the operations further comprise: determining a fourth set of GNSS satellites based upon the third set of GNSS satellites; and acquiring a fifth set of GNSS satellites to produce third acquisition data for a time T3, the acquiring operation only attempting to acquire satellites from the third set of GNSS satellites.

In Example 6, the subject matter of any one or more of Examples 1-5 optionally include wherein the operations of determining the second set of GNSS satellites based upon the first set of GNSS satellites comprises operations of: utilizing a machine learning association rule.

In Example 7, the subject matter of Example 6 optionally includes wherein the operations of determining the second set of GNSS satellites based upon the first set of GNSS satellites utilizing the machine learning association rule comprises operations of maximizing a confidence score.

Example 8 is a method of locating a computing device, the method comprising: acquiring a first set of Global Navigation Satellite System (GNSS) satellites from a first set of raw GNSS signal data received by a GNSS receiver to produce first acquisition data, the first set of raw GNSS signal data received at a first time T; determining a second set of GNSS satellites based upon the first set of GNSS satellites; acquiring a third set of GNSS satellites based upon a received second set of raw GNSS signal data corresponding to a second time T2 to produce second acquisition data, the operation of acquiring the third set of GNSS satellites only attempting to acquire satellites from the second set of GNSS satellites; and utilizing the first acquisition data to calculate a position of the computing device at time T and utilizing the second acquisition data to calculate a position of the computing device at time T2.

In Example 9, the subject matter of Example 8 optionally includes sending the first and second acquisition data to a network-based GNSS service, the network-based GNSS service utilizing the first and second acquisition data to calculate the position of the computing device at time T and T2.

In Example 10, the subject matter of any one or more of Examples 8-9 optionally include performing a least squares minimization at the computing device.

In Example 11, the subject matter of any one or more of Examples 8-10 optionally include wherein determining the second set of GNSS satellites based upon the first set of GNSS satellites comprises: setting the second set of GNSS satellites to be the first set of GNSS satellites; and wherein the method further comprises: determining that a number of satellites acquired in the third set of GNSS satellites is less than a predetermined threshold, and in response, reacquiring the third set of GNSS satellites based upon the received second set of raw GNSS signal data to produce the second acquisition data, the acquiring operation attempting to acquire satellites from the first set of GNSS satellites.

In Example 12, the subject matter of any one or more of Examples 8-11 optionally include determining a fourth set of GNSS satellites based upon the third set of GNSS satellites; and acquiring a fifth set of GNSS satellites to produce third acquisition data for a time T3, the acquiring operation only attempting to acquire satellites from the third set of GNSS satellites.

In Example 13, the subject matter of any one or more of Examples 8-12 optionally include wherein determining the second set of GNSS satellites based upon the first set of GNSS satellites comprises utilizing a machine learning association rule.

In Example 14, the subject matter of Example 13 optionally includes wherein determining the second set of GNSS satellites based upon the first set of GNSS satellites utilizing the machine learning association rule comprises maximizing a confidence score.

Example 15 is a machine-readable medium comprising instructions, which when performed by a machine, cause the machine to execute operations comprising: acquiring a first set of Global Navigation Satellite System (GNSS) satellites from a first set of raw GNSS signal data received by a GNSS receiver to produce first acquisition data, the first set of raw GNSS signal data received at a first time T; determining a second set of GNSS satellites based upon the first set of GNSS satellites; acquiring a third set of GNSS satellites based upon a received second set of raw GNSS signal data corresponding to a second time T2 to produce second acquisition data, the operation of acquiring the third set of GNSS satellites only attempting to acquire satellites from the second set of GNSS satellites; and utilizing the first acquisition data to calculate a position of the computing device at time T and utilizing the second acquisition data to calculate a position of the computing device at time T2.

In Example 16, the subject matter of Example 15 optionally includes operations of: sending the first and second acquisition data to a network-based GNSS service, the network-based GNSS service utilizing the first and second acquisition data to calculate the position of the computing device at time T and T2.

In Example 17, the subject matter of any one or more of Examples 15-16 optionally include the operations of: performing a least squares minimization at the computing device.

In Example 18, the subject matter of any one or more of Examples 15-17 optionally include wherein the operations of determining the second set of GNSS satellites based upon the first set of GNSS satellites comprises the operations of: setting the second set of GNSS satellites to be the first set of GNSS satellites, and wherein the operations further comprise: determining that a number of satellites acquired in the third set of GNSS satellites is less than a predetermined threshold, and in response, reacquiring the third set of GNSS satellites based upon the received second set of raw GNSS signal data to produce the second acquisition data, the acquiring operation attempting to acquire satellites from the first set of GNSS satellites.

In Example 19, the subject matter of any one or more of Examples 15-18 optionally include wherein the operations further comprise: determining a fourth set of GNSS satellites based upon the third set of GNSS satellites; and acquiring a fifth set of GNSS satellites to produce third acquisition data for a time T3, the acquiring operation only attempting to acquire satellites from the third set of GNSS satellites.

In Example 20, the subject matter of any one or more of Examples 15-19 optionally include wherein the operations of determining the second set of GNSS satellites based upon the first set of GNSS satellites comprises the operations of utilizing a machine learning association rule.

In Example 21, the subject matter of Example 20 optionally includes wherein the operations of determining the second set of GNSS satellites based upon the first set of GNSS satellites utilizing the machine learning association rule comprises the operations of maximizing a confidence score.

Example 22 is a computing device comprising: means for acquiring a first set of Global Navigation Satellite System (GNSS) satellites from a first set of raw GNSS signal data received by a GNSS receiver to produce first acquisition data, the first set of raw GNSS signal data received at a first time T; means for determining a second set of GNSS satellites based upon the first set of GNSS satellites; means for acquiring a third set of GNSS satellites based upon a received second set of raw GNSS signal data corresponding to a second time T2 to produce second acquisition data, the operation of acquiring the third set of GNSS satellites only attempting to acquire satellites from the second set of GNSS satellites; and means for utilizing the first acquisition data to calculate a position of the computing device at time T and utilizing the second acquisition data to calculate a position of the computing device at time T2.

In Example 23, the subject matter of Example 22 optionally includes means for: sending the first and second acquisition data to a network-based GNSS service, the network-based GNSS service utilizing the first and second acquisition data to calculate the position of the computing device at time T and T2.

In Example 24, the subject matter of any one or more of Examples 22-23 optionally include means for performing a least squares minimization at the computing device.

In Example 25, the subject matter of any one or more of Examples 22-24 optionally include wherein the means for determining the second set of GNSS satellites based upon the first set of GNSS satellites comprises means for: setting the second set of GNSS satellites to be the first set of GNSS satellites; and wherein the computing device further comprises: means for determining that a number of satellites acquired in the third set of GNSS satellites is less than a predetermined threshold, and in response, reacquiring the third set of GNSS satellites based upon the received second set of raw GNSS signal data to produce the second acquisition data, the acquiring operation attempting to acquire satellites from the first set of GNSS satellites.

In Example 26, the subject matter of any one or more of Examples 22-25 optionally include means for: determining a fourth set of GNSS satellites based upon the third set of GNSS satellites; and means for acquiring a fifth set of GNSS satellites to produce third acquisition data for a time T3, the acquiring operation only attempting to acquire satellites from the third set of GNSS satellites.

In Example 27, the subject matter of any one or more of Examples 22-26 optionally include wherein determining the second set of GNSS satellites based upon the first set of GNSS satellites comprises utilizing a machine learning association rule.

In Example 28, the subject matter of Example 27 optionally includes wherein determining the second set of GNSS satellites based upon the first set of GNSS satellites utilizing the machine learning association rule comprises maximizing a confidence score.

What is claimed is:

1. A computing device comprising:
    a Global Navigation Satellite System (GNSS) receiver configured to receive raw GNSS signal data from GNSS satellites in a system of GNSS satellites;
    a hardware processor communicatively coupled to the GNSS receiver, wherein the hardware processor and the GNSS receiver have no access to current orbit information of the GNSS satellites; and
    a memory, communicatively coupled to the hardware processor and comprising instructions, which when executed by the hardware processor cause the computing device to execute operations comprising:
    correlating a received first set of the raw GNSS signal data to all coarse acquisition (C/A) codes used by the GNSS satellites in the system of the GNSS satellites to acquire a first set of GNSS satellites, the first set of raw GNSS signal data received at a first time T, to produce first acquisition data identifying the time T and respective code phases for the C/A codes of satellites in the first set of GNSS satellites;
    determining a second set of GNSS satellites at a time second time, T2, after the first time T, based upon the first set of GNSS satellites, the second set of GNSS satellites being one of the first set of GNSS satellites or a subset of the first set of GNSS satellites based on patterns of past satellite visibility;
    acquiring a third set of GNSS satellites, based upon a received second set of raw GNSS signal data corresponding to the second time T2 and respective C/A codes of the GNSS satellites in the second set of GNSS satellites to produce second acquisition data, the third set of GNSS satellites having fewer GNSS satellites than the first set of GNSS satellites; and
    utilizing the first acquisition data to determine a position of the computing device at time T and utilizing the second acquisition data to determine a position of the computing device at time T2.

2. The computing device of claim 1, wherein the operation of utilizing the first acquisition data to determine the position of the computing device at time T and utilizing the second acquisition data to determine the position of the computing device at time T2 comprises operations of:
    sending the first and second acquisition data to a network-based GNSS service, the network-based GNSS service utilizing the first and second acquisition data to determine the position of the computing device at time T and at time T2, respectively.

3. The computing device of claim 1, wherein the operation of utilizing the first acquisition data to determine the position of the computing device at time T and utilizing the second acquisition data to determine the position of the computing device at time T2 comprises performing a least squares minimization at the computing device.

4. The computing device of claim 1, wherein the operation of determining the second set of GNSS satellites based upon the first set of GNSS satellites comprises operations of:
    setting the second set of GNSS satellites to be the first set of GNSS satellites; and
    wherein the operation of acquiring the third set of GNSS satellites further comprises:
    determining that a number of GNSS satellites acquired in the third set of GNSS satellites is less than a predetermined threshold, and in response, reacquiring the third set of GLASS satellites based upon the received second set of raw GNSS signal data and all of the C/A codes used by the GNSS satellites in a system of GNSS satellites to produce the second acquisition data.

5. The computing device of claim 1, wherein the operations further comprise:
  determining a fourth set of GNSS satellites based upon the third set of GNSS satellites; and
  acquiring a fifth set of GNSS satellites, based on respective C/A codes of satellites in the fourth set of GNSS satellites, to produce third acquisition data for a time T3.

6. The computing device of claim 1, wherein the operation of determining the second set of GNSS satellites comprises utilizing a machine learning association rule to determine the second set of GNSS satellites based on the patterns of past satellite visibility.

7. The computing device of claim 6, wherein the operation of determining the second set of GNSS satellites utilizing the machine learning association rule comprises operations of maximizing a confidence score.

8. A method of locating a computing device, the method comprising:
  acquiring a first set of Global Navigation Satellite System (GNSS) satellites from a first set of raw GNSS signal data received by a GNSS receiver and all coarse acquisition (C/A) codes used by GNSS satellites in a system of the GNSS satellites to produce first acquisition data, the first set of raw GNSS signal data received at a first time T the first acquisition data identifying the time T and respective code phases for the C/A codes of the GNSS satellites in the first set of GNSS satellites, wherein the GNSS receiver has no access to current orbit information of the GNSS satellites;
  determining a second set of GNSS satellites at second time, T2, after the first time T, based upon the first set of GNSS satellites the second set of GNSS satellites being one of the first set of GNSS satellites or a subset of the first set of GNSS satellites based on patterns of past satellite visibility, the second set of GNSS satellites determined;
  acquiring a third set of GNSS satellites based upon a received second set of raw GNSS signal data corresponding to the second time T2 and respective C/A codes of the GNSS satellites in the second set of GNSS satellites to produce second acquisition data, the third set of GNSS satellites having fewer GNSS satellites than the first set of GNSS satellites; and
  utilizing the first acquisition data to determine a position of the computing device at time T and utilizing the second acquisition data to determine a position of the computing device at time T2.

9. The method of claim 8, wherein utilizing the first acquisition data to determine the position of the computing device at time T and utilizing the second acquisition data to determine the position of the computing device at time T2 comprises:
  sending the first and second acquisition data to a network-based GNSS service, the network-based. GNSS service utilizing the first and second acquisition data to determine the position of the computing device at time T and at time T2, respectively.

10. The method of claim 8, wherein utilizing the first acquisition data to determine the position of the computing device at time T and utilizing the second acquisition data to determine the position of the computing device at time T2 comprises:
  performing a least squares minimization at the computing device.

11. The method of claim 8, wherein determining the second set of GNSS satellites based upon the first set of GNSS satellites comprises:
  setting the second set of GNSS satellites to be the first set of GNSS satellites; and
  wherein the method further comprises:
  determining that a number of GNSS satellites acquired in the third set of GNSS satellites is less than a predetermined threshold, and in response, reacquiring the third set of GNSS satellites based upon the received second set of raw GNSS signal data and all of the C/A codes used by the GNSS satellites in the system of GNSS satellites to produce the second acquisition data.

12. The method of claim 8, comprising:
  determining a fourth set of GNSS satellites based upon the third set of GNSS satellites; and
  acquiring a fifth set of GNSS satellites, based on respective C/A codes of the GNSS satellites in the fourth set of GNSS satellites, to produce third acquisition data for a time T3.

13. The method of claim 8, wherein determining the second set of GNSS satellites based upon the first set of GNSS satellites comprises utilizing a machine learning association rule to determine the second set of GNSS satellites based on the patterns of past satellite visibility.

14. The method of claim 13, wherein determining the second set of GNSS satellites utilizing the machine learning association rule comprises maximizing a confidence score.

15. A. tangible machine-readable memory comprising instructions, which when performed by a machine, cause the machine to execute operations comprising:
  acquiring a first set of Global Navigation Satellite System (GNSS) satellites from a first set of raw GNSS signal data received by a GNSS receiver and all coarse acquisition (C/A) codes used by the GNSS satellites in a system of the GNSS satellites to produce first acquisition data, the first set of raw GNSS signal data received at a first time T, the first acquisition data identifying the time T and respective code phases for the C/A codes of GNSS satellites in the first set of GNSS satellites, wherein the GNSS receiver has no access to current orbit information of the GNSS satellites;
  determining a second set of GNSS satellites at a second time, T2, after the first time T, based upon the first set of GNSS satellites, the second set of GNSS satellites being one of the first set of GNSS satellites or a subset of the first set of GNSS satellites based on patterns of past satellite visibility the second set of GNSS satellites;
  acquiring a third set of GNSS satellites based upon a received second set of raw GNSS signal data corresponding to the second time T2 and respective C/A codes of GNSS satellites in the second set of GNSS satellites to produce second acquisition data, the third set of GNSS satellites having fewer GNSS satellites than the first set of GNSS satellites; and
  utilizing the first acquisition data to determine a position of the machine at time T and utilizing the second acquisition data to determine a position of the machine at time T2.

16. The tangible machine-readable memory of claim 15, wherein the operation of utilizing the first acquisition data to determine the position of the machine at time T and utilizing the second acquisition data to determine the position of the machine at time T2 comprises operations of:

sending the first and second acquisition data to a network-based GNSS service at time T and at time T2, the network-based GNSS service utilizing the first and second acquisition data to determine the position of the machine at time T and at time T2, respectively.

17. The tangible machine-readable memory of claim 15, wherein the operation of utilizing the first acquisition data to determine the position of the machine at time T and utilizing the second acquisition data to determine the position of the machine at time T2 comprises performing a least squares minimization at the machine.

18. The tangible machine-readable memory of claim 15, wherein the operation of determining the second set of GNSS satellites based upon the first set of GNSS satellites comprises the operations of:

setting the second set of GNSS satellites to be the first set of GNSS satellites; and wherein the operation further comprises:

determining that a number of GNSS satellites acquired in the third set of GNSS satellites is less than a predetermined threshold, and in response, reacquiring the third set of GNSS satellites based upon the received second set of raw GNSS signal data and all of the C/A codes used by the GNSS satellites in the system of GNSS satellites to produce the second acquisition data.

19. The tangible machine-readable memory of claim 15, wherein he operations further comprise:

determining a fourth set of GNSS satellites based upon the third set of GNSS satellites; and acquiring a fifth set of GNSS satellites, based on respective C/A codes of the GNSS satellites in the fourth set of GNSS satellites, to produce third acquisition data for a time T3.

20. The tangible machine-readable memory of claim 15, wherein the operation of determining the second set of GNSS satellites based upon the first set of GNSS satellites comprises utilizing a machine learning association rule to determine the second set of GNSS satellites based on the patterns of past satellite visibility.

* * * * *